United States Patent [19]

Spalding

[11] 4,033,629
[45] July 5, 1977

[54] AUTOMATIC FREIGHT CAR BRAKE APPARATUS WITH SPRING-APPLIED FLUID-PRESSURE-RELEASED HAND BRAKE

[75] Inventor: Williard P. Spalding, Penn Hills, Pa.

[73] Assignee: Westinghouse Air Brake Company, Wilmerding, Pa.

[22] Filed: June 9, 1976

[21] Appl. No.: 694,146

[52] U.S. Cl. .................................. 303/2; 188/107; 188/170; 303/63
[51] Int. Cl.² ....................................... B60T 13/04
[58] Field of Search ............. 188/107, 170; 303/2, 303/9, 13, 63, 68

[56] References Cited
UNITED STATES PATENTS

| | | | |
|---|---|---|---|
| 1,061,900 | 5/1913 | Clelland | 188/107 |
| 1,792,895 | 2/1931 | Cowlishaw | 303/63 |
| 2,318,798 | 5/1943 | Piron | 303/63 |

*Primary Examiner*—Duane A. Reger
*Attorney, Agent, or Firm*—W. F. Poore; R. W. McIntire, Jr.

[57] ABSTRACT

The usual brake cylinder in a conventional freight car brake apparatus is replaced by a novel cylinder that embodies a pair of pistons and a spring of sufficient strength to effect a hand brake application. Conventional brake applications and releases are effected accordingly as the usual brake control valve effects the supply of fluid under pressure to and the release thereof from one of the two pistons which are connected to a common piston rod through which force is transmitted to brake applying brake shoes. The second piston is subjected on one side to the force of the spring and on the other side selectively to brake pipe pressure or pressure in a hand brake release reservoir that is charged from the brake pipe to a higher pressure by an air-driven air booster operated by air from the brake pipe. Thus, the spring is enabled to effect a hand brake application in the absence of fluid under pressure acting on the other side of the second piston. This application may be released by the supply of fluid under pressure to this other side of the second piston from either the release reservoir or the brake pipe, or some other independent source.

21 Claims, 2 Drawing Figures

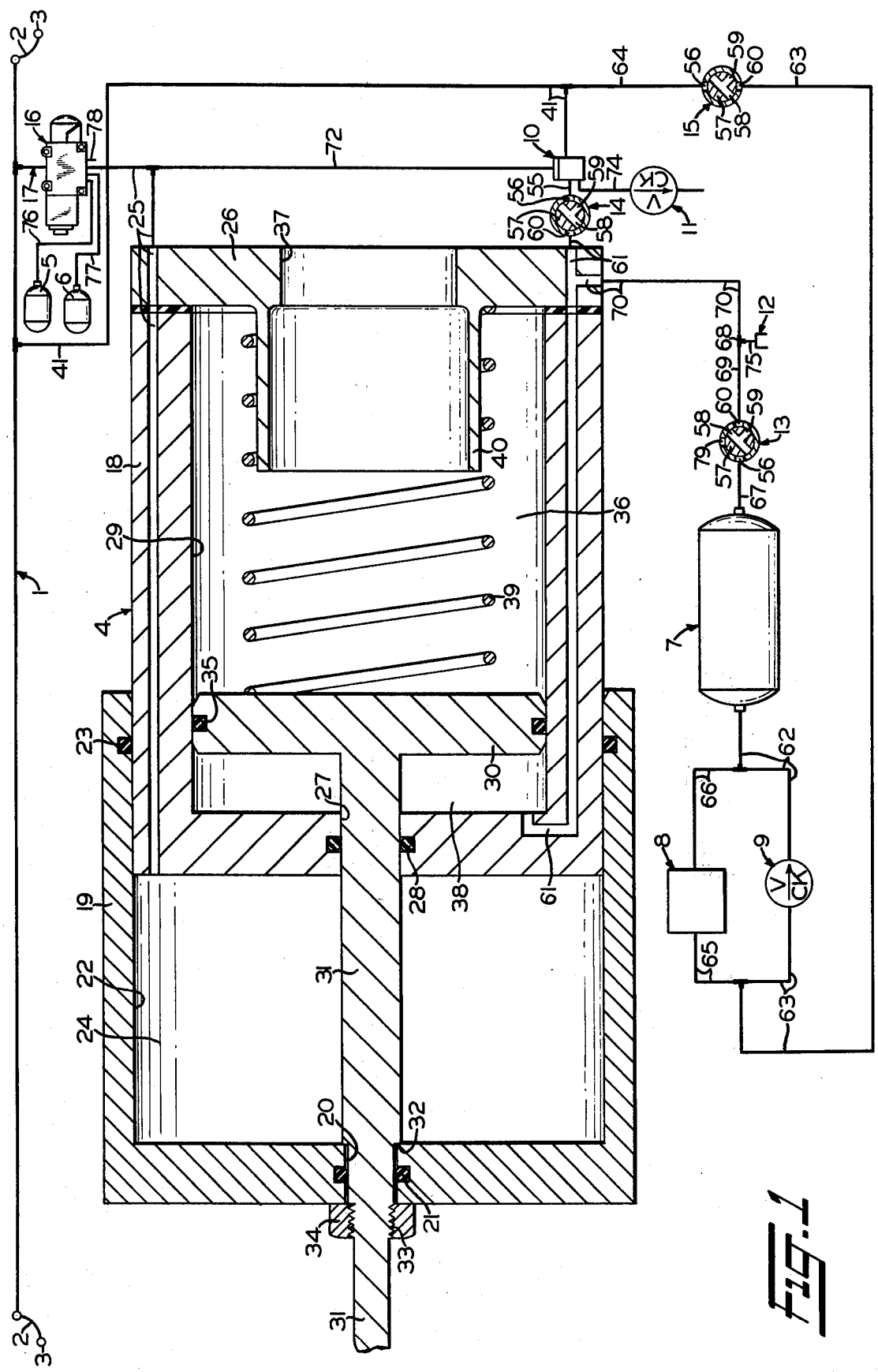

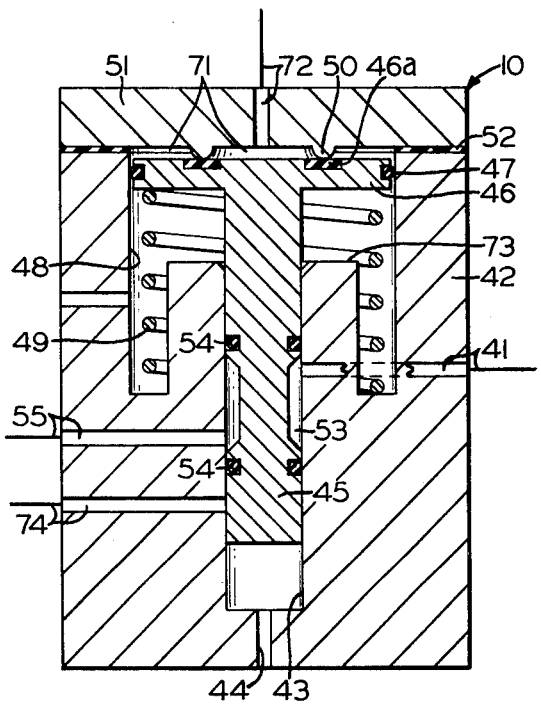

AUTOMATIC FREIGHT CAR BRAKE APPARATUS WITH SPRING-APPLIED FLUID-PRESSURE-RELEASED HAND BRAKE

BACKGROUND OF THE INVENTION

Conventional fluid pressure operated railway freight car brake apparatus is fail-safe in operation in that an automatic brake application is effected on all cars in a train upon the loss of train brake pipe pressure as from, for example, a break-in-two of the train brake pipe.

In addition to the conventional fluid pressure operated brake apparatus, it is necessary that each freight car be provided with a hand brake which must be applied when the car is to be detached from a train for any appreciable period of time since the fluid pressure emergency brake application effected at the time the car is detached is released as the result of leakage of the fluid under pressure from the fluid pressure brake apparatus. A conventional hand brake apparatus embodies a chain and hand brake wheel whereby a trainman effects a hand brake application by the application of considerable manual force to this wheel. Accordingly, it has been found in actual practice that trainmen often times apply insufficient manual force to this hand brake wheel to cause the brake shoes to be pressed against the tread surface of the car wheels with the required degree of force necessary to insure that the car cannot be moved by a malicious person.

Furthermore, many times when a car is detached from a train, the trainmen are negligent in that no attempt is made to effect a hand brake application on the detached car. It is obvious that such a detached car is hazardous.

Accordingly, it is the general purpose of the present invention to provide a conventional fluid pressure operated automatic freight car brake apparatus with a novel brake cylinder having a hand brake applying spring and a release reservoir charged from the brake pipe by an air-driven air booster from which reservoir, or the train brake pipe, fluid under pressure may be supplied to the brake cylinder to compress the spring and thereby release the hand brake application.

SUMMARY OF THE INVENTION

According to the present invention, a freight car brake apparatus embodies therein a novel brake cylinder that has two spaced-apart pistons connected to a common brake-applying piston rod and a hand-brake-applying spring of sufficient strength to effect a hand brake application. One of the two pistons, when subject on one side to fully charged brake pipe pressure in the absence of brake cylinder pressure acting on the other piston, is effective to compress the spring and thereby effect a brake release. This freight car brake apparatus further includes a hand brake release reservoir from which fluid under pressure may be supplied, under manual control of a trainman, to the one side of the one piston and an air-driven air booster, operated by and supplied with air from the train brake pipe, for effecting charging of this release reservoir to a pressure substantially higher than that carried in the train brake pipe.

In the accompanying drawings:

FIG. 1 is a diagrammatic view of a railway freight car brake apparatus embodying the invention.

FIG. 2 is a vertical sectional view of a cut-off valve device shown in outline in FIG. 1.

DESCRIPTION

Referring to FIG. 1 of the drawings, a railway freight car brake apparatus embodying the invention comprises a brake pipe 1 that extends from end to end of the freight car and at each end is connected by the usual hoses 2 and hose couplings 3 to the brake pipe on the adjacent car. The railway freight car brake apparatus shown in FIG. 1 further comprises a novel brake cylinder 4, an auxiliary reservoir 5, an emergency reservoir 6, a hand brake release reservoir 7, an air booster 8 for charging the release reservoir 7 from the brake pipe 1 to a chosen pressure higher than the pressure carried in the brake pipe 1 subsequent to the charging of this reservoir 7 to the pressure in the brake pipe via a first one-way flow or check valve device 9, a cut-off valve device 10 for controlling flow of fluid under pressure from the brake pipe 1 to the novel brake cylinder 4, a spring-loaded one-way or check valve device 11 via which fluid under pressure from the brake cylinder 4 is released to atmosphere until a certain chosen pressure is retained therein, a quick connect coupling 12 to enable charging of the release reservoir 7 from such as, for example, a railway yard charging plant independently of the air booster 8 and brake pipe 1, three three-way valves 13, 14 and 15 and a brake control valve device 16 connected to the brake pipe 1 by a branch pipe 17 and controlled by variations of pressure in the brake pipe to effect the supply of fluid under pressure from the auxiliary reservoir 5 and emergency reservoir 6 to the brake cylinder 4 and the release of fluid under pressure from this cylinder 4 to atmosphere.

As shown in FIG. 1, the novel brake cylinder 4 comprises a first cup-shaped casing section 18, the outer peripheral surface of which may be machined to provide a smooth outer cylindrical surface, and a second cup-shaped casing section 19 slidably mounted on the outer smooth cylindrical surface of the first casing section 18. The second casing section 19 is provided with a bore 20 in the wall surface of which is provided an annular groove for receiving a first O-ring seal 21 and a coaxial counterbore 22 in the wall surface of which is provided an annular groove for receiving a second O-ring seal 23 that encircles and forms a seal with the smooth outer cylindrical surface of the first casing section 18 whereby the two casing sections 18 and 19 cooperate to form an annular brake cylinder chamber 24 to which fluid under pressure may be supplied from the brake cylinder port of the brake control valve device 16 via a pipe 25 and a correspondingly numbered passageway that extends through a piston stop member 26 that is secured to the open end of the first casing section 18 by any suitable means (not shown) and this casing section 18.

As may be seen from FIG. 1 of the drawings, the first casing section 18 is provided with a bore 27 in the wall surface of which is provided an annular groove for receiving therein a third O-ring seal 28 and a coaxial counterbore 29 to the outer end of which is secured the piston stop member 26 by any suitable means (not shown).

Slidably disposed in the counterbore 29 is a piston 30 that has formed integral with the left-hand face thereof a piston rod 31 that extends through the bores 20 and 27 and O-ring seals 21 and 28, as shown in FIG. 1.

The piston rod 31 is provided intermediate its ends with a shoulder 32 and a screw-threaded portion 33 for receiving a nut 34 whereby the bottom of the counterbore 22 in the casing section 19 is forced against the shoulder 32. Thus, the casing section 19 is so connected to the piston rod 31 as to constitute a second piston that is spaced apart along the length of this piston rod from the piston 30 which is provided with a peripheral annular groove in which is disposed an O-ring seal 35.

The O-ring seal 35 carried by the piston 30 forms a seal with the wall surface of the counterbore 29 thereby enabling the casing section 18 and this piston 30 to cooperatively form on the right-hand side of the piston 30 a chamber 36 that is always open to atmosphere via a bore 37 in the piston stop member 26, and on the left-hand side of this piston 30 a pressure chamber 38 to which fluid under pressure may be supplied in a manner hereinafter described.

As shown in FIG. 1, a heavy spring 39 for effecting a hand brake application is disposed in the atmospheric chamber 36 and is interposed between the right-hand side of the piston 30 and the left-hand side of the piston stop member 26.

In order that fluid under pressure supplied to the chamber 38 may shift the piston 30 in the direction of the right hand, as viewed in FIG. 1 of the drawings, and thereby compress the hand brake application spring 39 until it has a caged value of, for example, 4000 pounds, the left-hand side of the piston stop member 26 has formed integral therewith a sleeve member 40 which constitutes a stop for the piston 30. It should be understood that the diameters of the piston 30 and piston rod 31 and the pick-up of the spring 39 must be so selected that with a fluid pressure of, for example, 70 pounds per square inch, present in the chamber 38, the piston 30 will be shifted from the position in which it is shown in FIG. 1 in the direction of the right-hand until the right-hand face of this piston 30 abuts the left-hand end of the sleeve member 40. While the brakes are released and a train is traveling along a track, fluid under pressure is supplied from the brake pipe 1 to the chamber 38 in a manner hereinafter made apparent. Moreover, it should be understood that the normal fully charged pressure carried in the train brake pipe of trains operated by American railroads is always 70 pounds per square inch or higher. Therefore, it is apparent that while the brakes are released and the train brake pipe fully charged, the piston 30, piston rod 31, and casing section 19 will always occupy a brake release position in which the right-hand face of the piston 30 abuts the left-hand end of the sleeve member 40 irrespective of the normal fully charged train brake pipe pressure used by the particular railroad that may be hauling the freight car provided with the present invention at any given time.

In order that fluid under pressure may be supplied from the brake pipe 1 to the chamber 38 in the brake cylinder 4, one end of a branch pipe 41 is connected to the brake pipe 1 intermediate the ends thereof, as shown in FIG. 1. The opposite end of this branch pipe 41 is connected to one end of a correspondingly numbered passageway that extends through a casing 42 (FIG. 2) of the cut-off valve device 10 and at its other end opens at the wall surface of a first counterbore 43 that is coaxial with a bore 44 in the casing 42. This bore 44 provides a communication between the lower end of the counterbore 43 and atmosphere to prevent dashpot action as will be hereinafter apparent.

As shown in FIG. 2 of the drawings, a spool-type valve 45 is slidably mounted in the counterbore 43. Formed integral with the upper end of the spool-type valve 45 is a piston 46 the periphery of which is provided with a peripheral annular groove in which is disposed an O-ring seal 47 that forms a seal with the wall surface of a second counterbore 48 provided in the casing 42 and coaxial with the first counterbore 43.

Disposed about the spool-type valve 45 and interposed between the bottom of the counterbore 48 and the lower face of the piston 46 is a spring 49 that is effective to normally bias an annular resilient gasket 46a carried by the piston 46 in the upper face thereof against an annular stop 50 which is formed integral with the lower side of a cover member 51 that is secured to the upper end of the casing 42 by any suitable means (not shown), it being noted that a gasket 52 constructed of some suitable resilient material such as, for example, rubber, is interposed between the casing 42 and cover member 51.

As shown in FIG. 2, the spool-type valve 45 is provided intermediate the ends thereof with an elongated peripheral annular groove 53 and with a pair of peripheral annular grooves, one adjacent each end of the elongated peripheral annular groove 53, in each of which is disposed an O-ring seal 54 that forms a seal with the wall surface of the counterbore 43.

While the spool valve 45 occupies the position in which it is shown in FIG. 2, the elongated peripheral annular groove 53 thereon establishes a communication between the pipe and passageway 41 and one end of a passageway 55 that opens at the wall surface of the counterbore 43 at a location that is below the location at which the passageway 41 opens at this wall surface. This passageway 55 extends through the casing 42 and at its other end is connected by a correspondingly numbered pipe to an inlet port 56 (FIG. 1) of the hereinbefore-mentioned three-way valve 14.

A rotary member 57 of the three-way valve 14 is provided with a first passageway 58 and a second passageway 59 that intersects the first passageway 58 and forms a right angle therewith. The rotary member 57 may be rotated clockwise from the position in which it is shown in FIG. 1 through an angle of 45° to a second position in which the passageway 58 therein establishes a communication between the inlet port 56 and an outlet port 60 of this three-way valve 14.

Connected to the outlet port 60 is one end of a pipe 61 the opposite end of which is connected to a correspondingly numbered passageway that extends through the piston stop member 26 and casing section 18 and at its opposite end opens into the chamber 38 at the left-hand side of the piston 30.

Consequently, when a railway freight car provided with the brake apparatus shown in FIG. 1 is to be hauled in a train, the rotary member 57 of the three-way valve 14 will be rotated to its above-mentioned second position in which the passageway 58 therein establishes a communication between the inlet port 56 and the outlet port 60. Therefore, when the train brake pipe is charged in the usual manner to the normal pressure carried therein, fluid under pressure will flow from the brake pipe 1 to the chamber 38 via branch pipe and passageway 41, groove 53 (FIG. 2) on spool valve 45, passageway and pipe 55 (FIG. 1), inlet port 56, passageway 58, outlet port 60 and pipe and passageway 61 until the pressure in the chamber 38 is the same as the normal fully charged pressure carried in the train brake pipe.

In view of the foregoing, it is apparent that the pressure supplied from the train brake pipe to the chamber 38 at the left-hand side of the piston 30 is effective to shift this piston 30 from the position in which it is shown in FIG. 1 in the direction of the right hand, as viewed in FIG. 1, against the yielding resistance of the hand brake spring 39 until the right-hand side of the piston 30 abuts the left-hand end of the sleeve member 40.

Connected to the left-hand end of the hand brake release reservoir 7 is one end of a pipe 62 that has its opposite end connected to the outlet of the one-way or check valve device 9.

The three-way valves 13 and 15 may be identical in construction to the three-way valve 14. Therefore, corresponding elements of the three-way valves 13 and 15 are denoted by the same reference numerals.

Referring to FIG. 1 of the drawings, it will be seen that one end of a pipe 63 is connected to the inlet of the check valve device 9 and the opposite end of this pipe is connected to the outlet port 60 of the three-way valve 15, and one end of a pipe 64 is connected to the inlet port 56 of this three-way valve 15, the opposite end of this pipe 64 being connected to the hereinbefore-mentioned branch pipe 41 intermediate the ends thereof.

When a railway freight car provided with the brake apparatus shown in FIG. 1 is to be hauled in a train, the rotary member 57 of the three-way valve 15 will be rotated to its second position in which the passageway 58 therein establishes a communication between the inlet port 56 and the outlet port 60. Accordingly, when the train brake pipe is charged, fluid under pressure will flow from the brake pipe 1 to the hand brake release reservoir 7 via branch pipe 41, pipe 64, inlet port 56 of three-way valve 15, passageway 58, outlet port 60, pipe 63, one-way flow valve device 9 and pipe 62 until this reservoir 7 is charged to the normal fully charged pressure carried in the train brake pipe.

The hereinbefore-mentioned air booster 8 may be of any suitable commercially available type, such as that manufactured and sold by Haskel Engineering and Supply Company of Burbank, Calif. Briefly, this air booster 8 is a pump that employs the energy of a part of the fluid under pressure supplied thereto to raise the pressure of the remainder of this fluid under pressure to a higher pressure. Consequently, one end of a pipe 65 is connected to an inlet port (not shown) of the air booster 8, and one end of a pipe 66 is connected to an outlet port (not shown). The other end of the pipe 65 is connected to the pipe 63 intermediate the ends thereof and the other end of the pipe 66 is connected to the pipe 62 intermediate its ends.

In view of the foregoing, it is apparent that the air booster 8 is operatively effective to supply fluid under pressure from the train brake pipe to the hand brake release reservoir 7 to increase the pressure therein to a certain chosen pressure which is substantially higher than the normal fully charged pressure carried in the train brake pipe.

As shown in FIG. 1, one end of a pipe 67 is connected to the right-hand end of the hand brake release reservoir 7 and the other end of this pipe is connected to the inlet port 56 of the three-way valve 13, the outlet port 60 of which is connected to the left-hand outlet of a pipe tee 68 by a pipe 69. Connected to the right-hand outlet of the pipe tee 68 is one end of a pipe 70 the opposite end of which is connected to a correspondingly numbered passageway that extends through the piston stop member 26 and opens into the passageway 61 therein.

Consequently, subsequent to effecting a brake application and leakage of all fluid under pressure from the chambers 24 and 38, the brakes on the railway freight car provided with the brake apparatus shown in FIG. 1 may be manually released by a trainman moving the rotary member 59 of the three-way valve 13 from its first position in which it is shown in FIG. 1 to its second position in which the passageway 58 in this rotary member 57 establishes a communication between the pipe 67 and the pipe 69 via inlet port 56, passageway 58 and outlet port 60.

Therefore, when the rotary member 57 of the three-way valve 13 is moved to its second position, fluid in the hand brake release reservoir 7, which is at a pressure substantially higher than the normal fully charged train brake pipe pressure, will flow to chamber 38 at the left-hand side of the piston 30 via pipe 67, inlet port 56 of three-way valve 13, passageway 58, outlet port 60, pipe 69, pipe tee 68, pipe and passageway 70 and passageway 61.

The fluid at the high pressure present in the hand brake release reservoir 7 and acting on the left-hand side of the piston 30 will now shift this piston in the direction of the right hand, as viewed in FIG. 1, against the yielding resistance of the hand brake application spring 39 until the right-hand side of the piston 30 abuts the left-hand end of the sleeve member 40 thereby effecting a release of the brakes on the freight car.

Referring to FIG. 2 of the drawings, it will be noted that the cover 51 of the cut-off valve 10 cooperates with the piston 46 to form on the upper side of this piston a pressure chamber 71 into which opens one end of a passageway 72 that is connected by a correspondingly numbered pipe to the pipe 25 (FIG. 1) intermediate the ends thereof. Since the pipe 25 is connected to the brake cylinder port of the brake control valve device 16, as hereinbefore stated, fluid under pressure will be supplied to the chamber 71 (FIG. 2) whenever an automatic brake application is effected by operation of the brake control valve device 16.

Fluid under pressure supplied to the chamber 71 is effective to shift the piston 46 and the spool valve 45 downward against the yielding resistance of the spring 49 until the lower side of the piston 46 abuts a stop surface 73 formed on the casing 42.

In this lower position of the spool valve 45, the elongated peripheral annular groove 53 thereon establishes a communication between the one end of the passageway 55 that opens at the wall surface of the counterbore 43 and one end of a passageway 74 that opens at the wall surface of the counterbore 43 below the location at which the one end of the passageway 55 opens at this wall surface. The passageway 74 extends through the casing 42 and is connected by a corresponding numbered pipe to the inlet of the hereinbefore-mentioned spring-loaded one-way flow or check valve device 11 shown in FIG. 1.

The strength of the spring of the one-way flow valve device 11 may be such as to retain, for example, 60 pounds per square inch in the pipe 74 and the chamber 38.

The hereinbefore-mentioned quick connect coupling 12 may be of any suitable commercially available type, such as that manufactured and sold by the Hansen Manufacturing Company of Cleveland, Ohio. This coupling 12 is connected by a pipe 75 to the side outlet of the pipe tee 68.

Briefly, the quick connect coupling 12 comprises a socket secured to the outer end of the pipe 75 and a plug connected to one end of a hose (not shown) that at its opposite end is connected to a railway yard charging plant or some other suitable source of fluid under pressure. The plug may be easily pushed into the socket thereby establishing a fluid pressure communication through which fluid under pressure may be supplied from the yard charging plant, or other source of fluid under pressure, to the chamber 38 via the hose, the quick connect coupling 12, pipe 75, pipe tee 68, pipe and passageway 70 and passageway 61. Thus, a previously effected brake application may be manually released in the absence of fluid under pressure in the hand brake release reservoir 7. Accordingly, it is apparent that should the air booster 8 become inoperative, or a rupture occur in the piping between this booster 8 and the three-way valve 13, or the hand brake release reservoir 7 be damaged from any cause so that it usable to retain fluid under pressure therein, a release of a previously effected brake application may be accomplished by supplying fluid under pressure from a suitable independent source to the chamber 38 via the quick disconnect coupling 12.

The brake control valve device 16 may be substantially the same as that shown and described in U.S. Pat. No. 3,175,869, issued Mar. 30, 1965 to Walter B. Kirk, and assigned to the assignee of the present invention. Since this brake control valve device 16 operates in the same manner as the brake control valve device shown in the above-mentioned patent, a detailed description of this brake control valve device 16 is deemed unnecessary to an understanding of the present invention.

OPERATION — INITIAL CHARGING

To initially charge the railway freight car brake apparatus shown in FIG. 1, fluid under pressure is supplied to the train brake pipe and, therefore, to the brake pipe 1 on this car in the usual well-known manner. Fluid under pressure thus supplied to the brake pipe 1 flows via the branch pipe 17 to the brake control valve device 16. This brake control valve device 16 will now operate in the manner described in detail in the above-mentioned U.S. Pat. No. 3,175,869 to effect charging of the auxiliary reservoir 5 via a pipe 76 and of the emergency reservoir 6 via a pipe 77.

Moreover, the brake cylinder chamber 24 in the brake cylinder device 4 will be opened to atmosphere via the passageway and pipe 25, the brake control valve device 16 while in its release position and a pipe 78 that at one end is connected to an exhaust passageway (not shown) within the brake control valve device 16 and at the other end is open to atmosphere.

Since the chamber 71 (FIG. 2) in the cut-off valve device 10 is connected by the passageway and pipe 72 to the pipe 25 (FIG. 1), this chamber 71 is likewise open to atmosphere via the brake control valve device 16 and pipe 78.

While the chamber 71 (FIG. 2) is vented to atmosphere, the spring 49 is effective to bias the piston 46 and spool valve 45 to the position in which they are shown in FIG. 2 in which position the resilient gasket 46a carried by the piston 46 is biased against the annular stop 50 on the cover 51.

It may be assumed that the rotary members 57 of the three-way valves 14 and 15 (FIG. 1) but not that of the three-way valve 13, are placed in their second position at the time the railway freight car provided with the brake apparatus shown in FIG. 1 is placed in service on a railroad. Accordingly, the passageway 58 in three rotary members 57 will establish a communication from the corresponding outlet port 60 to the inlet port 56 of these three-way valves 14 and 15.

In view of the above, it is apparent that as fluid under pressure is supplied to the brake pipe 1, it will flow therefrom to the chamber 38 in the brake cylinder 4 via the branch pipe and passageway 41, groove 53 (FIG. 2) on the spool valve 45, passageway and pipe 55, inlet port 56 (FIG. 1) of three-way valve 14, passageway 58, outlet port 60, and pipe and passageway 61. It should be noted that with the rotary member 57 of the three-way valve 13 in the position shown in FIG. 1, fluid under pressure cannot flow from the passageway 61 to the hand brake release reservoir 7.

As the fluid under pressure supplied from the brake pipe 1 to the chamber 38, in the manner described above, increases the pressure in this chamber, the piston 30, piston rod 31 and casing section 19 will be shifted in the direction of the right-hand, as viewed in FIG. 1, against the yielding resistance of the hand brake application spring 39 until the right-hand side of the piston 30 abuts the left-hand end of the sleeve member 40. It will be understood from the foregoing that this shifting of the piston 30 and piston rod 31 effects a release of the brakes on the freight car provided with the brake apparatus shown in FIG. 1.

Furthermore, it will be understood that as the brake pipe 1 is charged, the air booster 8 will operate to supply fluid under pressure from the brake pipe 1 to the hand brake release reservoir 7 to effect charging of this reservoir to the hereinbefore-mentioned chosen pressure that is higher than the pressure in the normal fully charged train brake pipe.

SERVICE APPLICATION

A service brake application of the brakes is initiated by effecting a gradual reduction in train brake pipe pressure in the usual well-known manner. Since the brake pipe 1 is in communication with the brake control valve device 16, this brake control valve device will operate, in response to the reduction of pressure in the train brake pipe, in the manner described in the above-mentioned U.S. Pat. No. 3,175,869, to effect the supply of fluid under pressure to the chamber 24 in the brake cylinder 4 via the pipe and passageway 25.

Fluid under pressure supplied to the chamber 24, in the manner described above, acts in the direction of the left hand, as viewed in FIG. 1, on an area corresponding to the diameter of the annular chamber 24, less the area corresponding to the diameter of the piston rod 31, to transmit a fluid pressure force to this piston rod 31 via the nut 34.

Referring to FIG. 1;, it will be seen that as the pressure in the brake pipe 1 is reduced, fluid under pressure will flow from the chamber 38 to the brake pipe 1 via passageway and pipe 61, outlet port 60 of three-way valve 14, passageway 58, inlet port 56, pipe and passageway 55, groove 53 (FIG. 2) and passageway and branch pipe 41. Consequently, the pressure in the chamber 38 is reduced simultaneously as the pressure in the brake pipe 1 is reduced.

As the pressure in the chamber 38 is thus reduced, the spring 39 is rendered effective to transmit a force to the piston 30 and piston rod 31 which force acts in the direction of the left hand, as viewed in FIG. 1.

Consequently, the total force transmitted to the piston rod 31 is the sum of the fluid pressure force resulting from supply of fluid under pressure to the chamber 24 and the force on the piston 30 resulting from the difference of the force of the spring 39 acting on the right-hand face of the piston 30 and force of the reducing fluid pressure in the chamber 38 acting on the left-hand side of the piston 30.

It will be noted from FIGS. 1 and 2 that some of the fluid under pressure supplied to the pipe 25 flows therefrom to the pipe and passageway 72 and thence to the upper side of the piston 46 where it acts in a downward direction on the area within the annular stop 50. As soon as the pressure of the fluid acting on the upper side of the piston 46 within the annular stop 50 increases sufficiently to exceed the force of the spring 49, the piston 46 will be moved downward against the yielding resistance of the spring 49.

It can be seen from FIG. 2 that as the piston 46 begins to move downward, the gasket 46a carried in the upper face of this piston 46 is moved downward out of contact with the annular stop 50. It is apparent that, upon the gasket 46a being moved downward out of contact with the annular stop 50, the effective area of the upper side of the piston 46 that is subject to the fluid under pressure supplied through the pipe and passageway 72 is substantially increased. Therefore, the piston 46 and the spool valve 45 will be quickly moved downward with a "snap action" until the lower side of this piston abuts the stop surface 73 on the casing 42.

It may be understood from FIG. 2 of the drawings that while the spool valve 45 occupies its lower position, the groove 53 thereon cuts off communication between the passageways 41 and 55 and, therefore, between the brake pipe 1 and chamber 38 (FIG. 1), and establishes a communication between the passageways 55 and 74 (FIG. 2).

With a communication thus established between the passageways 55 and 74 via the groove 53, fluid under pressure will flow from the chamber 38 (FIG. 1) to atmosphere via passageway and pipe 61, outlet port 60 of three-way valve 14, passageway 58, inlet port 56, pipe and passageway 55, groove 53 on spool valve 45 now in its lower position, passageway and pipe 74 and spring-loaded check valve device 11 until the pressure in the chamber 38 is reduced to a chosen value determined by the spring-loaded check valve device 11, which chosen value may be, for example, 60 pounds per square inch, this value being determined by the strength of the spring of this check valve device 11.

As hereinbefore stated, the strength of the hand brake application spring 39 may be so selected that when it is compressed by the piston 30 until the right-hand side of this piston 30 abuts the left-hand end of the sleeve member 40, this spring will have a caged value of 4000 pounds.

Now if it be assumed that (1) the diameter of the piston 30 is 9 inches, (2) the diameter of the annular brake cylinder chamber 24 is 10 inches, and (3) the diameter of the piston rod 31 within chambers 24 and 38 is one-half inch, then it can be shown mathematically that for any chosen reduction of pressure in the brake pipe 1, the sum of the forces acting in the direction of the left hand, as viewed in FIG. 1 on the piston rod 31 for effecting a brake application is the same as that obtained in conventional railway freight car apparatus wherein a control valve device identical to the control valve device 16 supplies fluid under pressure to a brake cylinder having a brake-applying piston the diameter of which is ten inches.

Moreover, it can be shown mathematically that as the diameter of the annular brake cylinder chamber 24 is increased above the above-mentioned diameter of 10 inches, while the diameter of the piston 30 is maintained constant at the above-mentioned diameter of 9 inches, the available braking force for effecting a brake application on a railway freight car is correspondingly increased. Accordingly, it is apparent that the brake apparatus constituting the present invention can easily be adapted for use on railway freight cars that require different degrees of braking force by merely varying the diameter of the annular brake cylinder chamber 24 in accordance with the degree of braking force required for the particular car.

SERVICE LAP

In order to limit the degree of a brake application to that desired, the train brake pipe pressure is only reduced an amount sufficient to cause the brake control valve device 16 to operate to provide a corresponding pressure in the annular brake cylinder chamber 24 to cause a brake application on the freight car it being understood that the degree of this application is in accordance with the degree of reduction of the pressure in the brake pipe 1.

Subsequent to effecting the desired degree of reduction of pressure in the brake pipe 1, the brake control valve device 16 will move to its service lap position in the manner explained in hereinbefore-mentioned U.S. Pat. No. 3,175,869 to prevent further supply of fluid under pressure to the annular brake cylinder chamber 24.

ACCELERATED RELEASE OF BRAKES AFTER A SERVICE BRAKE APPLICATION

To effect a release of brakes following a service brake application, the train brake pipe and, therefore, the brake pipe 1 shown in FIG. 1, are recharged from the usual brake valve device (not shown) on the locomotive. Fluid under pressure thus supplied to the brake pipe 1 will cause the brake control valve device 16 to operate in the manner described in the above-mentioned U.S. Pat. No. 3,175,869 to release all fluid under pressure from the annular brake cylinder chamber 24 to atmosphere and effect charging of the auxiliary reservoir 5, and also the emergency reservoir 6 if it is not already fully charged.

Moreover, all fluid under pressure will be vented from the chamber 71 (FIG. 2) to atmosphere, whereupon spring 49 will shift the piston 46 and spool valve 45 upward to the position shown in FIG. 2.

When the spool valve 45 is returned to the position shown in FIG. 2, fluid under pressure will flow from the brake pipe 1 to the chamber 38 (FIG. 1) in the manner hereinbefore described in connection with initial charging.

As fluid under pressure is released from the chamber 24 by the brake control valve device chamber 16 and supplied from the brake pipe 1 to the chamber 38, the piston 30, piston rod 31 and casing section 19 will be shifted in the direction of the right hand against the yielding resistance of the spring 39 until the right-hand side of the piston 30 abuts the left-hand end of the sleeve member 40. This shifting of the piston rod 31 effects a release of the brakes on the freight car provided with the brake apparatus shown in FIG. 1.

EMERGENCY APPLICATION

To effect an emergency application of the brakes, fluid under pressure is suddenly vented at a rapid rate from the train brake pipe and, therefore, the brake pipe 1. The brake control valve device 16 will now operate in response to this rapid release of fluid under pressure from the brake pipe 1, in the manner described in the above-mentioned U.S. Pat. No. 3,175,869, to effect the supply of fluid under pressure from both the auxiliary reservoir 5 and the emergency reservoir 6 to the annular brake cylinder chamber 24 to provide therein a pressure that is higher than is obtained in this chamber when a full service brake application is effected.

The brake cylinder 4 will operate in the same manner as hereinbefore described for a service brake application, However, since a higher pressure is obtained in the brake cylinder chamber 24 when an emergency brake application is effected, a correspondingly higher braking force is provided by the brake cylinder 4 for forcing the brake shoes against the tread surface of the car wheels.

RELEASE OF BRAKES AFTER AN EMERGENCY BRAKE APPLICATION

If a railway freight car provided with the brake apparatus shown in FIG. 1 is not detached from the train subsequent to effecting an emergency application, and there has been no rupture in the train brake pipe, a release of the emergency application may be effected by supplying fluid under pressure from the brake valve on the locomotive to the train brake pipe and, therefore, to the brake pipe 1 on the freight car.

Fluid under pressure thus supplied to brake pipe 1 will flow therefrom to the brake control valve device 16 via the branch pipe 17 whereupon this valve device 16 will operate in the manner described in hereinbefore-mentioned U.S. Pat. No. 3,175,869 to effect a release of the emergency brake application and charging of the auxiliary reservoir 5 and emergency reservoir 6.

HAND BRAKE OPERATION

When a railway freight car is detached from a train and set off on a siding, all fluid under pressure is vented from the brake pipe 1, whereupon the brake control valve device 16 on this car effects an emergency brake application thereon. This emergency brake application is effective to supply fluid under pressure from both the auxiliary reservoir 5 and the emergency reservoir 6 to the annular brake cylinder chamber 24 in the brake cylinder 4 and also to release fluid under pressure from the chamber 38 to atmosphere via the cut-off valve device 10 and the spring-loaded check valve device 11 until the pressure in this chamber 38 is reduced to 60 pounds per square inch.

As is well known by those skilled in the art of railroad operation, the fluid under pressure in the chambers 24 and 38 will be reduced to atmospheric pressure as the result of leakage therefrom if the car remains detached from the train for any appreciable length of time.

As hereinbefore stated, the strength of the spring 39 may be such that when the right-hand side of the piston 30 abuts the left-hand end of the sleeve member 40, this spring exerts a force of approximately 4000 pounds on the piston 30. Therefore, it is apparent from FIG. 1 that as the pressure in the chamber 38 is reduced to the above-mentioned value of 60 pounds per square inch via the spring-loaded check valve device 11 when a brake application is effected, this spring 39 will expand somewhat as the piston 30 shifts in the direction of the left-hand to the brake applied position in which it is shown so that the force exerted by this spring 39, while slightly less than 4000 pounds, is still sufficient to maintain the brake shoes pressed against the tread surface of the corresponding wheels, subsequent to leakage of all fluid under pressure from the chambers 28 and 38, with sufficient force to prevent movement of the freight car so long as atmospheric pressure is present in the chambers 24 and 38.

From the foregoing, it is apparent that the freight car brake apparatus shown in FIG. 1 of the drawings includes therein a fail-safe hand brake that is automatically applied in response to leakage of fluid under pressure from the brake cylinder 4 subsequent to a car being detached from a train. Accordingly, it is apparent that when the car is set off on a siding, it is not necessary that a member of the train crew manually apply the hand brake to prevent undesired movement of the car, as has heretofore been required.

It is the usual practice, when moving one or several freight cars from one location in a railroad classification yard to another by a yard or shifting locomotice, to manually release the hand brake on the car or cars but not to charge the brake pipe 1 on these cars, it being understood that an application of the fluid pressure brake on the locomotive is used to provide a sufficient braking force to properly control the locomotive and the several cars being moved thereby from one location to another.

Accordingly, let is be assumed that a freight car provided with the brake apparatus shown in FIG. 1 is to be moved from one location to another in a railway classification yard. At the time this car was set off from a train, the release of all fluid under pressure from the brake pipe 1 caused an emergency brake application to be effected on the car.

Assuming that the car has been set off from the train a sufficient length of time for all fluid under pressure to leak from the chambers 24 and 38 to atmosphere, it will be understood that the hand brake application spring 39 is effective to transmit a sufficient force through the piston 30 and piston rod 31 to the brake shoes to prevent undesired movement of the car.

Therefore, prior to the yard locomotive moving the car from one location to another in the classification yard, it is necessary to release the brake application effected thereon by the hand brake application spring 39.

Accordingly, to release the brake application effected on the car by the spring 39, a trainman will rotate clockwise the rotary member 57 of the three-way valve 13, by means such as a handle (not shown), from its first position in which it is shown in FIG. 1 to its second position in which the passageway 58 establishes a communication between the inlet port 56 and the outlet port 60.

Assuming that the hand brake release reservoir 7 has been charged to the hereinbefore-mentioned chosen pressure by operation of the air booster 8, fluid under pressure will now flow from this reservoir 7 to the chamber 38 via pipe 67, inlet port 56, passageway 58, outlet port 60, pipe 69, pipe tee 68, pipe and passageway 70 and passageway 61. The fluid under pressure thus supplied to the chamber 38 will shift the piston 30 in the direction of the right hand against the yielding resistance of the spring 39 until the right-hand side of this piston 30 abuts the left-hand end of the sleeve member 40 thereby effecting a release of the brakes on the freight car. This car may now be moved by the yard locomotive from one location in the classification yard to another.

Subsequent to movement of the car to the second location, a hand brake application may be effected, to prevent undesired movement of the car, by a trainman rotating the rotary member 57 of the three-way valve 13 counterclockwise from the position shown in FIG. 1 to a third position in which the passageway 58 is in alignment with an exhaust port 79.

Fluid under pressure will now flow from the chamber 38 to atmosphere via passageway 61, passageway and pipe 70, pipe tee 68, pipe 69, outlet port 60, passageways 59 and 58, and exhaust port 79. As fluid under pressure is thus released from the chamber 38, the spring 39 is rendered effective to shift the piston 30, piston rod 31 and casing section 19 in the direction of the left hand to effect a reapplication of the brakes on the car.

By manual operation of the three-way valve 13, a trainman may effect a series of brake applications and brake releases on the car until the fluid under pressure in the hand brake release reservoir 7 is depleted.

It will be understood that whenever the car is again coupled into a train and the brake pipe 1 charged, fluid under pressure will flow from the brake pipe 1 to the chamber 38 to effect movement of the piston 30, piston rod 31 and casing section 19 in the direction of the right hand until the right-hand side of the portion 30 abuts the left-hand end of the sleeve member 40 thereby effecting a release of the brakes on the car. Thus, a brake release is assured whenever the car is coupled into a train and the train brake pipe charged.

When an emergency brake application is effected, the fluid under pressure in both the auxiliary reservoir 5 and the emergency reservoir 6 equalize into the chamber 24 in the brake cylinder 4. The volumes of these reservoirs and the chamber 24 are such that the resulting equalized pressure is substantially less than the pressure to which the hand brake reservoir 7 is charged by the air booster 8. Therefore, a brake application on the car may be manually released by a trainman moving the rotary member 57 of the three-way valve 13 to its second position even though fluid at the equalized pressure is still present in the brake cylinder chamber 24 since this equalized pressure is substantially less than the pressure of the fluid supplied from the hand brake release reservoir 7 to the chamber 30.

Having now described the invention, what I claim as new and desire to secure by Letters Patent is:

1. In a vehicle combined fluid pressure and hand brake apparatus including a normally charged brake pipe, an auxiliary reservoir, an emergency reservoir and a fluid pressure operated brake control valve device operable responsively to variations of pressure in the brake pipe to effect fluid pressure brake applications and brake releases, said brake apparatus comprising:

a. fluid pressure operated means for effecting a brake application on the vehicle and a subsequent brake release responsive to operation of the brake control valve device to effect the supply of fluid under pressure from one or both of said reservoirs to said fluid pressure operated means and the release of fluid under pressure therefrom, wherein the improvement comprises;

b. a brake release reservoir,
   c. means for effecting charging of said brake release reservoir to a pressure higher than that in the normally charged brake pipe,
   d. spring means for causing a brake application on the vehicle independently of the operation of the brake control valve device,
   e. fluid motor means operable in response to the supply of fluid under pressure thereto to render said spring means ineffective to cause a brake application on the vehicle, and
   f. means whereby fluid under pressure may be supplied to said fluid motor means from any one of a plurality of sources of fluid under pressure.

2. The combined fluid pressure and hand brake apparatus, as recited in claim 1, further characterized in that said means for effecting charging of said brake release reservoir comprises an air booster operable by fluid under pressure from the brake pipe to effect the supply of fluid under pressure from the brake pipe to the brake release reservoir at a pressure substantially higher than the pressure in the normally charged brake pipe.

3. The combined fluid pressure and hand brake apparatus, as recited in claim 1, further characterized in that said fluid motor means comprises;

a. first cup-shaped cylindrical member having an open end and a closed end, said closed end having a bore extending therethrough,
   b. a piston slidably mounted in said first cylindrical member, and
   c. a piston rod extending through said bore in said closed end of said cylindrical member to the exterior thereof, the interior end of said rod being integral with one side of said piston and the exterior end being operatively connected to said fluid pressure operated means, and in that said fluid pressure operated means comprises;

d. a second cup-shaped cylindrical member slidably mounted on said first cup-shaped cylindrical member and cooperating therewith to form a fluid pressure chamber to which fluid under pressure is supplied and from which fluid under pressure is released by the operation of the brake control valve device.

4. The combined fluid pressure and hand brake apparatus, as recited in claim 1, further characterized by fluid pressure operated valve means controlling a supply communication between the brake pipe and said fluid motor means and operated by fluid under pressure supplied by the brake control valve device to said fluid pressure operated means to close said supply communication and establish a release communication through which fluid under pressure may be released from said fluid motor means to atmosphere, and by a spring-loaded one-way flow valve means disposed in said release communication to retain a chosen pressure in said fluid motor means.

5. The combined fluid pressure and hand brake apparatus, as recited in claim 1, further characterized in that two of said plurality of sources of fluid under pressure from which fluid under pressure may be supplied to said fluid motor comprise the brake pipe and said brake release reservoir.

6. The combined fluid pressure and hand brake apparatus, as recited in claim 1, further characterized in that said means whereby fluid under pressure may be supplied to said fluid motor means comprises;
   a. a first conduit extending between the brake pipe and said fluid motor means,
   b. a manually operable valve disposed in said first conduit for controlling flow of fluid under pressure therethrough,
   c. a second conduit extending between said brake release reservoir and said fluid motor means,
   d. a manually operable three-way valve disposed in said second conduit, said three-way valve being manually movable from a first position in which communication between said brake release reservoir and said fluid motor means is closed to either a second position in which a communication is established through which fluid under pressure can flow from said brake release reservoir to said fluid motor means to operate said fluid motor means to render said spring means ineffective to cause a brake application, or to a third position in which a communication is established through which fluid under pressure can flow from said motor means to atmosphere whereupon said spring means is rendered effective to cause a brake application on the vehicle.

7. The combined fluid pressure and hand brake apparatus, as recited in claim 1, further characterized in that said means for effecting charging of said brake release reservoir comprises;
   a. a one-way flow valve controlling flow of fluid under pressure from the brake pipe to said brake release reservoir whereby said reservoir is charged to the normally charged pressure in the brake pipe, and
   b. an air booster connected in parallel relation to said one-way flow valve and operable by fluid under pressure from the brake pipe to effect the supply of fluid under pressure from the brake pipe to said brake release reservoir at a chosen higher pressure than the pressure of the fluid in the brake pipe whereby said reservoir is charged to said chosen higher pressure.

8. The combined fluid pressure and hand brake apparatus, as recited in claim 1, further characterized in that said means whereby fluid under pressure may be supplied from said brake pipe to said fluid motor means comprises;
   a. a cut-off valve device including;
      i. a valve operable from a first position in which it establishes a first communication between said brake pipe and said fluid motor means to a second position in which said first communication is closed and a second communication is established through which fluid under pressure may be released from said motor means to atmosphere,
      ii. a spring, and
      iii. a movable abutment subject in opposing relation to the force of said spring and fluid under pressure supplied to said fluid pressure operated means for effecting a brake application and operative responsively to the force of said fluid under pressure exceeding the force of said spring to shift said valve from its said first position to its said second position to close said first communication and open said second communication.

9. The combined fluid pressure and hand brake apparatus, as recited in claim 1, further characterized in that said fluid motor means comprises a piston subject on its respective opposite sides to the force of said spring means and the pressure in the brake pipe and operatively connected to said fluid pressure operated means for effecting a brake application, whereby said spring is effective to transmit a force through said piston and said fluid pressure operated means to effect a brake application on the vehicle in response to leakage of fluid under pressure from both said fluid pressure operated means and that side of said piston subject to the pressure in the brake pipe.

10. The combined fluid pressure and hand brake apparatus, as recited in claim 2, further characterized by a manually operable valve for controlling a communication between the brake pipe and said air booster.

11. The combined fluid pressure and hand brake apparatus, as recited in claim 3, further characterized by a stop member carried by said first cylindrical member between which and one side of said piston said spring means is interposed within said bore in said first cylindrical member, and the other side of said piston is subject to the pressure in any one of said plurality of sources of fluid under pressure whereby said piston effects compression of said spring means to a chosen degree while said other side of said piston is subject to the pressure in any one of said plurality of sources of fluid under pressure.

12. The combined fluid pressure and hand brake apparatus, as recited in claim 4, further characterized by a manually operable valve for controlling flow of fluid under pressure between said fluid pressure operated valve means and said fluid motor means.

13. The combined fluid pressure and hand brake apparatus, as recited in claim 6, further characterized by a fluid pressure operated valve means disposed in said first conduit between said brake pipe and said manually operable valve therein for controlling a supply communication between the brake pipe and said manually operable valve and operated by fluid under pressure supplied by the brake control valve device to said fluid pressure operated means for effecting a brake application to close said supply communication and establish a release communication through which fluid under pressure may be released from said fluid motor to atmosphere via said manually operable valve and said fluid pressure operated valve means, and by a spring-loaded one-way flow valve means disposed in said release communication to retain a chosen pressure in said fluid motor.

14. For use with a vehicle combined fluid pressure and hand brake apparatus including a normally charged brake pipe, an auxiliary reservoir, an emergency reservoir and a fluid pressure operated brake control valve device operable responsively to variations of pressure in the brake pipe to effect the supply of fluid under pressure from one or both of said reservoirs for effecting a brake application and the release of said fluid under pressure to effect a brake release, a brake applying means to which said fluid under pressure is supplied for effecting a brake application on the vehicle, said brake applying means comprising;
   a. a pair of telescopically arranged cup-shaped cylindrical members, each having a bore therein coaxial with the longitudinal axis of said members and cooperating one with the other to form therebetween a first chamber to which fluid under pressure may be supplied by the brake control valve device, b. a piston slidably mounted within the inner one of said pair of cylindrical members and cooperating therewith to form a second chamber to which fluid under pressure may be supplied from the brake pipe, c. a piston rod secured at one end to one side of said piston and extending through said bore in each of said telescopically arranged cylindrical members, said piston rod being rigidly secured to the outer one of said pair of cylindrical members, whereby a braking force is transmitted to said piston rod in response to the supply of fluid under pressure to said first chamber, d. a piston stop member secured to said inner cylindrical member, and e. spring means disposed in said inner cylindrical member and interposed between said piston stop member and the other side of said piston, said spring means being effective in the absence of fluid under pressure in said second chamber to transmit a brake applying force to said piston rod via said piston for effecting a brake application on the vehicle independently of the operation of the brake control valve device.

15. The brake applying means, as recited in claim 14, further characterized in that said inner cylindrical member is provided with a first conduit through which fluid under pressure may be supplied to said first chamber in response to operation of the brake control valve device.

16. The brake applying means, as recited in claim 14, further characterized in that said cylindrical member is provided with a first conduit through which fluid under pressure may be supplied to said second chamber in response to charging the brake pipe with fluid under pressure.

17. The brake applying means, as recited in claim 14, further characterized in that said inner cylindrical member is provided with a first conduit through which fluid under pressure may be supplied to said first chamber in response to operation of the brake control valve device, and with a second conduit through which fluid under pressure may be supplied to said second chamber in response to charging the brake pipe with fluid under pressure.

18. The brake applying means, as recited in claim 14, further characterized in that said other side of said piston is constantly subject to atmospheric pressure.

19. The brake applying means, as recited in claim 14, further characterized in that said piston is moved against the yielding resistance of said spring means into abutting relationship with said piston stop member in response to the establishment in said second chamber of a certain chosen pressure.

20. The brake applying means, as recited in claim 14, further characterized in that said piston is moved against the yielding resistance of said spring means into abutting relationship with said piston stop member in response to the establishment in the brake pipe of a certain chosen minimum pressure.

21. The brake applying means, as recited in claim 20, further characterized in that said first chamber and said second chamber are each annular, and in that, when the ratio of the diameter of the first annular chamber to the diameter of the second annular chamber is 1.111 and the pressure in said second annular chamber is a chosen degree less than said certain chosen minimum brake pipe pressure, the braking force provided by said brake applying means in response to the supply of fluid under pressure to said first annular chamber by the brake control valve device is the same as that provided by a brake applying means having a single piston and a corresponding annular chamber each of which have a diameter of 10 inches.

* * * * *

UNITED STATES PATENT AND TRADEMARK OFFICE
CERTIFICATE OF CORRECTION

PATENT NO. : 4,033,629
DATED : July 5, 1977
INVENTOR(S) : Willard P. Spalding

It is certified that error appears in the above-identified patent and that said Letters Patent are hereby corrected as shown below:

Column 17, line 39, before "cylindrical" insert --inner--

Signed and Sealed this

Thirteenth Day of December 1977

[SEAL]

Attest:

RUTH C. MASON
Attesting Officer

LUTRELLE F. PARKER
Acting Commissioner of Patents and Trademarks